United States Patent
Satake

(10) Patent No.: US 8,448,749 B2
(45) Date of Patent: May 28, 2013

(54) LUBRICATING APPARATUS FOR FOLLOWER BEARING

(75) Inventor: Ryouichi Satake, Mino (JP)

(73) Assignee: Nippon Thompson Co., Ltd., Minato-Ku, Tokyo (JP)

(*) Notice: Subject to any disclaimer, the term of this patent is extended or adjusted under 35 U.S.C. 154(b) by 321 days.

(21) Appl. No.: 12/881,340

(22) Filed: Sep. 14, 2010

(65) Prior Publication Data

US 2011/0061974 A1    Mar. 17, 2011

(30) Foreign Application Priority Data

Sep. 14, 2009   (JP) ................. 2009-211467

(51) Int. Cl.
- F16N 1/00 (2006.01)
- F16C 17/00 (2006.01)
- F16C 21/00 (2006.01)
- F16C 43/00 (2006.01)

(52) U.S. Cl.
USPC ................................. 184/5; 184/14

(58) Field of Classification Search
USPC ........................................ 184/110, 5
See application file for complete search history.

(56) References Cited

U.S. PATENT DOCUMENTS

| | | | | |
|---|---|---|---|---|
| 680,345 A | * | 8/1901 | Morrison | 184/100 |
| 1,797,467 A | * | 3/1931 | Dusinberre | 439/819 |
| 4,113,399 A | * | 9/1978 | Hansen, Sr. | 403/329 |
| 4,556,150 A | * | 12/1985 | Ikumi | 220/4.21 |
| 4,821,374 A | * | 4/1989 | Gavagan | 16/321 |
| 5,115,541 A | * | 5/1992 | Stichel | 24/20 R |
| 5,355,678 A | * | 10/1994 | Beitner | 62/3.2 |
| 5,541,685 A | * | 7/1996 | Jessop | 396/319 |
| 5,745,025 A | * | 4/1998 | Reuss | 338/167 |
| 5,764,456 A | * | 6/1998 | Fitzgerald et al. | 360/130.32 |
| 5,842,512 A | * | 12/1998 | Guerrero | 165/80.3 |
| 5,921,140 A | * | 7/1999 | Lemmens | 74/473.28 |
| 5,923,507 A | * | 7/1999 | Steele et al. | 360/130.32 |
| 5,964,315 A | * | 10/1999 | Suzuki et al. | 180/441 |
| 5,971,753 A | * | 10/1999 | Heiser | 433/11 |
| 6,733,233 B2 | * | 5/2004 | Jasklowski et al. | 415/135 |
| 7,261,272 B2 | * | 8/2007 | Courbon | 248/475.1 |
| 7,766,552 B2 | * | 8/2010 | Tsuboi et al. | 384/462 |
| 2007/0251764 A1 | * | 11/2007 | Tsuboi et al. | 184/100 |

FOREIGN PATENT DOCUMENTS

JP     4278659     6/2009

* cited by examiner

Primary Examiner — William A Rivera
Assistant Examiner — Henry Liu
(74) Attorney, Agent, or Firm — Cozen O'Connor

(57) ABSTRACT

A leaf spring (S) and a lubricating member (L) are combined together and then mounted. The lubricating member (L) has a pair of protrusions (9) protruding from one of the two sides thereof to make contact with an outer ring (2) and a pair of wall faces (13) formed on the other side opposite to the pair of protrusions (9). The leaf spring (S) is formed in a mountain-like shape in cross section and provided with a pair of protruding pieces (14) that protrude from bottom edges of the mountain-like shape and respectively make contact with the wall faces (13) of the lubricating member to pinch the wall faces (13).

2 Claims, 6 Drawing Sheets

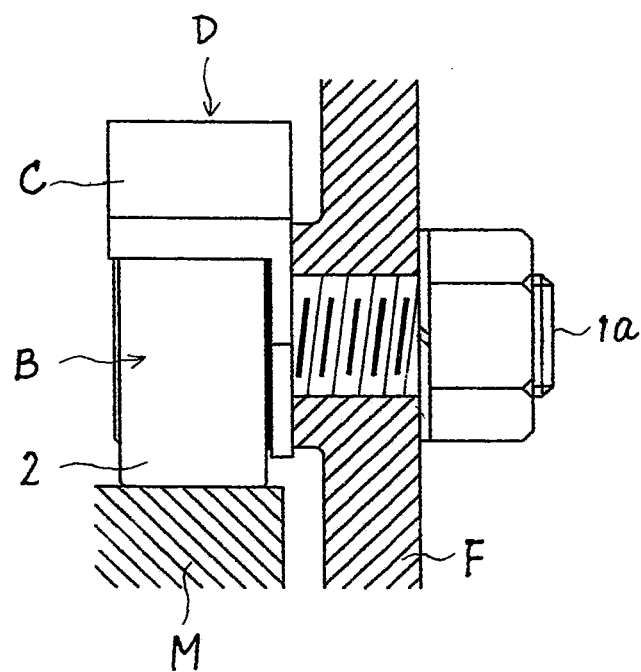
Fig. 5  *Prior Art*

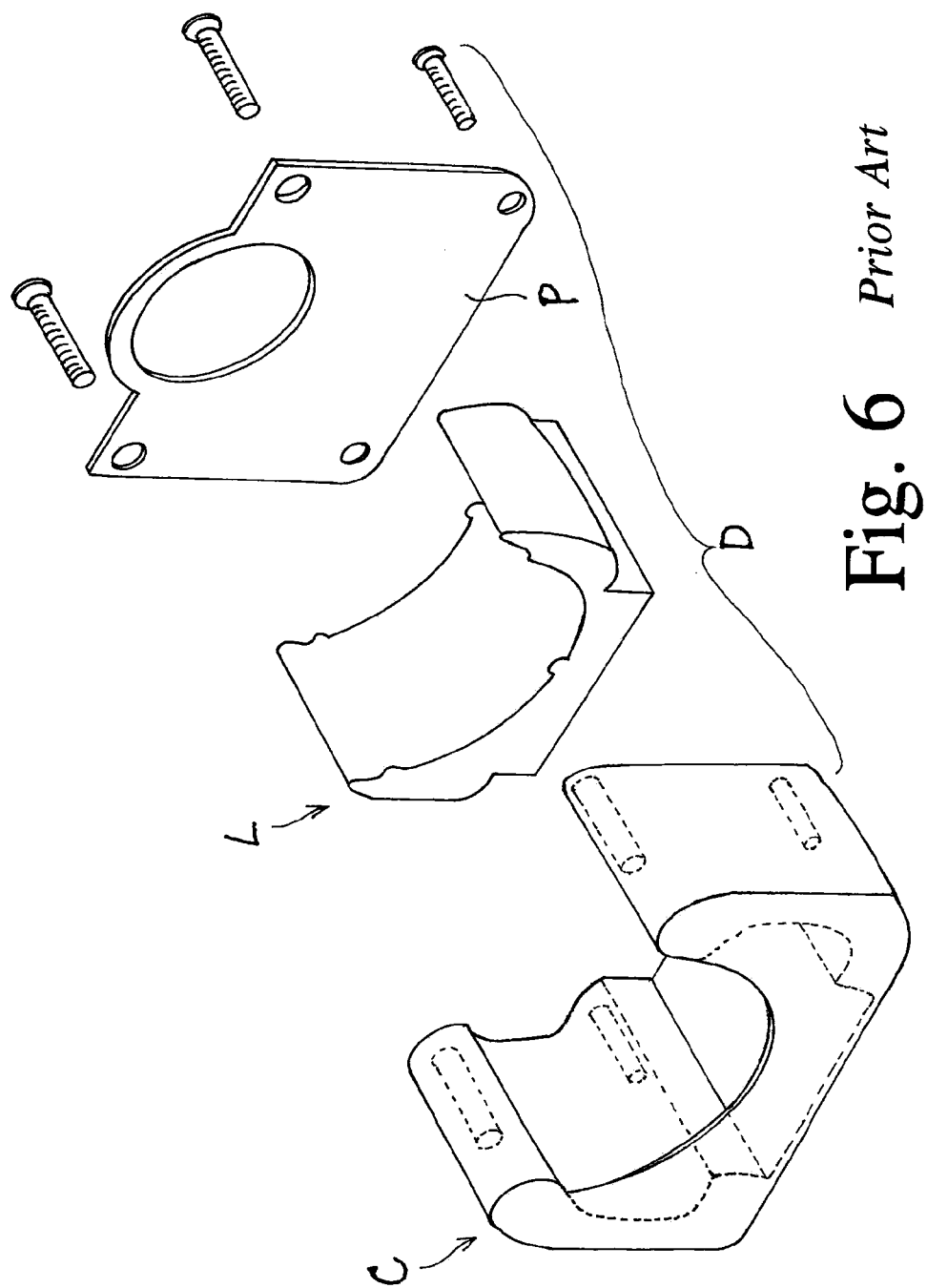
Fig. 6  *Prior Art*

LUBRICATING APPARATUS FOR FOLLOWER BEARING

BACKGROUND OF THE INVENTION

1. Field of the Invention

This invention relates to a lubricating apparatus of lubricating an outer ring of a follower bearing.

2. Background of the Invention

In the related art, such a type of a lubricating apparatus for a follower bearing is known from Patent Document 1, which is shown in FIG. 6.

A commonly-known lubricating apparatus D as illustrated in FIG. 6 comprises a casing C, a lubricating member L mounted in the casing C and a plate member P covering a side surface of the casing C.

After the lubricating member L is mounted in the casing C, the plate member P is secured to the casing C by screws. In the lubricating apparatus D shown in FIG. 6, the casing C and the plate member P are separate members.

Because the commonly-known lubricating apparatus D illustrated in FIG. 6 comprises the casing C and the plate member P that are separate members, the number of components of the lubricating apparatus D is increased and also the number of steps of assembling the same is increased. To address this disadvantage, a lubricating apparatus illustrated in FIGS. 3 and 4 has been developed, which comprises a casing C molded in one piece of a metal-made ring r and resin by use of a die.

A follower bearing B using the lubricating apparatus D has an outer ring 2 rotatably mounted on the peripheral of a support shaft 1. The support shaft 1 has an end with which a screw portion 1a is formed integrally. The screw portion 1a extends outward from the outer ring 2.

The follower bearing B is fitted in the casing C and supports a supported object M having a rotation-receiving surface on which the outer ring 2 is to rotate as shown in FIG. 5. Specifically, the screw portion 1a extends through a stationary member F and is locked by a nut tightened onto the projecting screw portion 1a. The follower bearing B secured to the stationary member F in this way is in contact with the supported object M, so that the follower bearing B rotates during the movement of the supported object M relative to the stationary member F so as to make full use of the bearing capability.

On the other hand, a shaft hole 4 is formed in the casing C which holds the lubricating member L for lubricating the outer ring 2. After the support shaft 1 of the follower bearing B is passed through the shaft hole 4, a bottom face 5 is opposite to the outer ring 2. A positioning recess 6 is formed in a central area of the bottom face 5 and extends parallel to the axis of the support shaft 1. The positioning recess 6 is formed in a mountain shape in cross section.

In the casing C side faces 7 are formed on opposite sides of the bottom face 5, and catch pawls 8 are formed on the respective side faces 7.

The lubricating member L, which includes a sintered resin member which is of a porous structure impregnated with a lubricant, is mounted in the casing C structured as described above. The lubricating member L used may be made by overheating and solidifying a mixture of a powder of a thermoplastic resin material such as polyethylene or polypropylene with a lubricating oil or a lubricating grease.

A pair of protrusions 9 keeping a predetermined distance from each other is formed on the face of the lubricating member L which will face the outer ring 2 after the lubricating member L is mounted in the casing C. The protrusions 9 are located parallel to the axis of the support shaft 1 and to make contact with the outer ring 2. The contact face of each protrusion 9 is formed in an arc shape. Such a contact of the arc faces of the protrusions 9 to the outer ring 2 provides lubrication to the outer ring 2, and also the lubricant adhering to the outer ring 2 at this time lubricates the rotation-receiving surface of the supported object M.

The lubricating member L has recesses 10 formed in the other face opposite to the face on which the protrusions 9 are formed such that the recesses 10 have the respective downward open ends as shown in FIG. 4. In addition, catch lugs 11 are formed outside the recesses 10 for engagement with the catch pawls 8.

The lubricating member L designed as described above is mounted in the casing C such that a leaf spring S is interposed between the lubricating member L and the bottom face 5. The leaf spring S has a mountain-like shape in cross section with a top 12 aligned with the positioning recess 6.

For mounting the lubricating member L in the casing C, the casing C is placed so that its bottom face 5 points downward as shown in FIG. 4. Then, the leaf spring S is set on the bottom face 5 while the top 12 of the leaf spring S is aligned with the positioning recess 6. With the leaf spring S held in place in the casing C, the lubricating member L is pressed into the casing C against a spring force of the leaf spring S, and then the catch lugs 11 are engaged with the catch pawls 8 of the casing C.

Then, a screw portion 1a of the support shaft 1 is passed through the shaft hole 4 of the casing C with the lubricating member L thus fitted therein. Then, the screw portion 1a is passed through the hole drilled in the stationary member F shown in FIG. 5 and then is secured through a spring washer by a nut.

Citation List

Patent Document 1 JP Patent No. 4278659

In the well-known follower bearing illustrated in FIGS. 3, 4, since the top 12 of the leaf spring S is simply placed on the positioning recess 6, the leaf spring S remains very unstable until the lubricating member L is mounted. For this reason, when the lubricating member L is mounted in the casing C, the top 12 of the leaf spring S may slide out of the positioning recess 6 in some cases. However, it is impossible to check a position of the mounted leaf spring S from the outside once the lubricating member L has been mounted in the casing C. Thus, if the leaf spring S deviates from the positioning recess 6 in the casing C, the follower bearing with the leaf spring S deviating is shipped. Alternatively, if the leaf spring S deviating from its correct position is forcibly fitted, the leaf spring S may possibly be deformed. In some cases, however, the follower bearing may be shipped without finding the deformation of the leaf spring.

If the deviation or deformation of the leaf spring S is not corrected, the balance will be lost between the pressing forces of the protrusions 9, provided on the lubricating member L, applied to the outer ring 2. This gives rise to a disadvantage that an offset load acts on the outer ring 2 and therefore the bearing capability is impaired.

Usually, one leaf spring S is mounted on the positioning recess 6. Inadvertently, however, two closely stacked leaf springs S may be possibly mounted on. Such mounting of the two closely stacked leaf springs S causes an increase in spring force to be higher than necessary. In this case, the bearing capability is also impaired. In addition, such mounting of the two closely stacked leaf springs S for each follower bearing means the use of a larger number of leaf springs than necessary, leading to a disadvantageous increase in cost.

When the casing C and the plate member P, which are illustrated in FIG. 6, are designed as separate components, even if the leaf spring S deviates from its correct position or it is deformed as described above, they can be recognized in the process of attaching the plate member P. However, when the casing C is structured as one piece, it is impossible to recognize the deviation or deformation of the leaf spring S.

In other words, the disadvantageous problems of the lubricating apparatus illustrated in FIGS. 3, 4 newly arise by structuring the casing C as one piece.

SUMMARY OF THE INVENTION

It is an object of the present invention to provide a lubricating apparatus for a follower bearing allowing a leaf spring to be set in a normal state at all times and making it impossible to mounting two inadvertently stacked leaf springs.

The present invention relates to a lubricating apparatus for a follower bearing which comprises an outer ring that is capable of rotating relative to a support shaft, a casing that has a shaft hole formed therein to allow the support shaft to pass through the shaft hole and covers the outer ring of which the support shaft is passed through the shaft hole, a lubricating member that is made of a resin impregnated with a lubricant and is mounted in the casing, and a leaf spring that is interposed between the casing and the lubricating member and presses the lubricating member against the outer ring, In an aspect of the present invention, the lubricating member is formed to have a pair of protrusions protruding from one of the two sides of the lubricating member to make contact with the outer ring, and a pair of wall faces formed on the other side opposite to the pair of protrusions. Also, the leaf spring is formed in a mountain-like shape in cross section, and is provided with a pair of protruding pieces that protrude from bottom edges of the mountain-like shape and respectively make contact with the wall faces of the lubricating member to pinch the pair of the wall faces.

In an another aspect of the present invention, the casing has a bottom face formed opposite to the outer ring, and a positioning recess formed in the bottom face for holding a top of the leaf spring.

According to the present invention, since the leaf spring is provided with protruding pieces that are formed at its two side ends in order to pinch the wall faces of the lubricating member, the leaf spring can be combined with the lubricant member into one piece, and then the leaf, together with the lubricant member, can be mounted in the casing. As a result, the leaf spring does not deviate from its correct position or deform in the casing as happens in related art. In turn, the lubricating member does not exert an offset load on the outer ring so as to prevent impairment of the bearing capability.

Since the leaf spring can be attached to the lubricating member before being mounting in the casing, the two stacked leaf springs will not be inadvertently mounted together in one casing. In consequence, the disadvantages arising from inadvertent mounting of the two stacked leaf springs will not be eliminated.

BRIEF DESCRIPTION OF THE DRAWINGS

FIG. 5 is a diagram illustrating how to attach the follower bearing in related art.

FIG. 6 is an exploded perspective view illustrating a lubricating apparatus for a follower bearing in related art.

DESCRIPTION OF EMBODIMENTS

Figure 1:
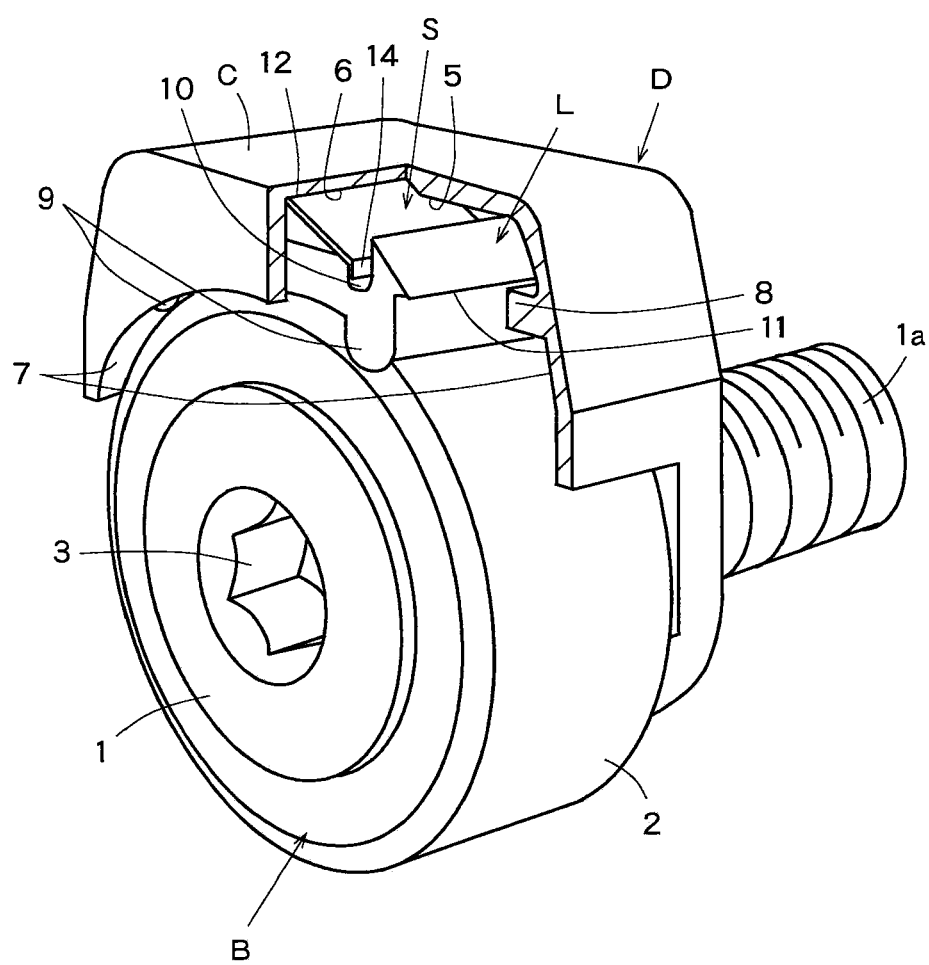
FIG. 1 is a partially cut-away perspective view illustrating a casing of a lubricating apparatus according to the present invention.
Figure 2:
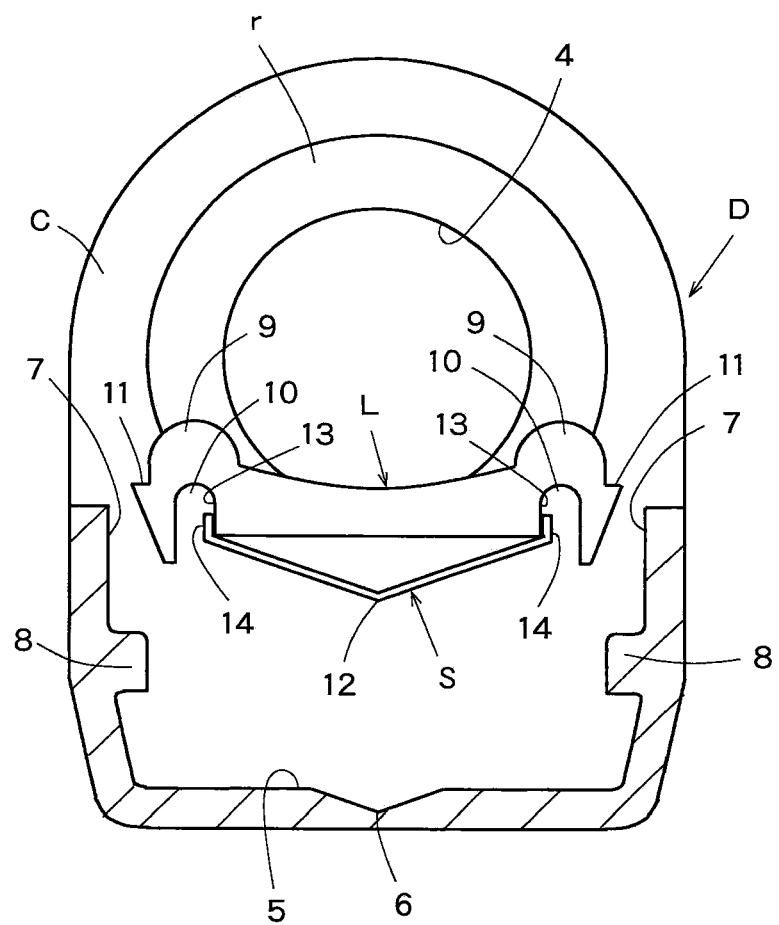
FIG. 2 is a partial cross-sectional view illustrating the casing according to the present invention separated from a lubricating member mounted with a leaf spring.
Figure 3:
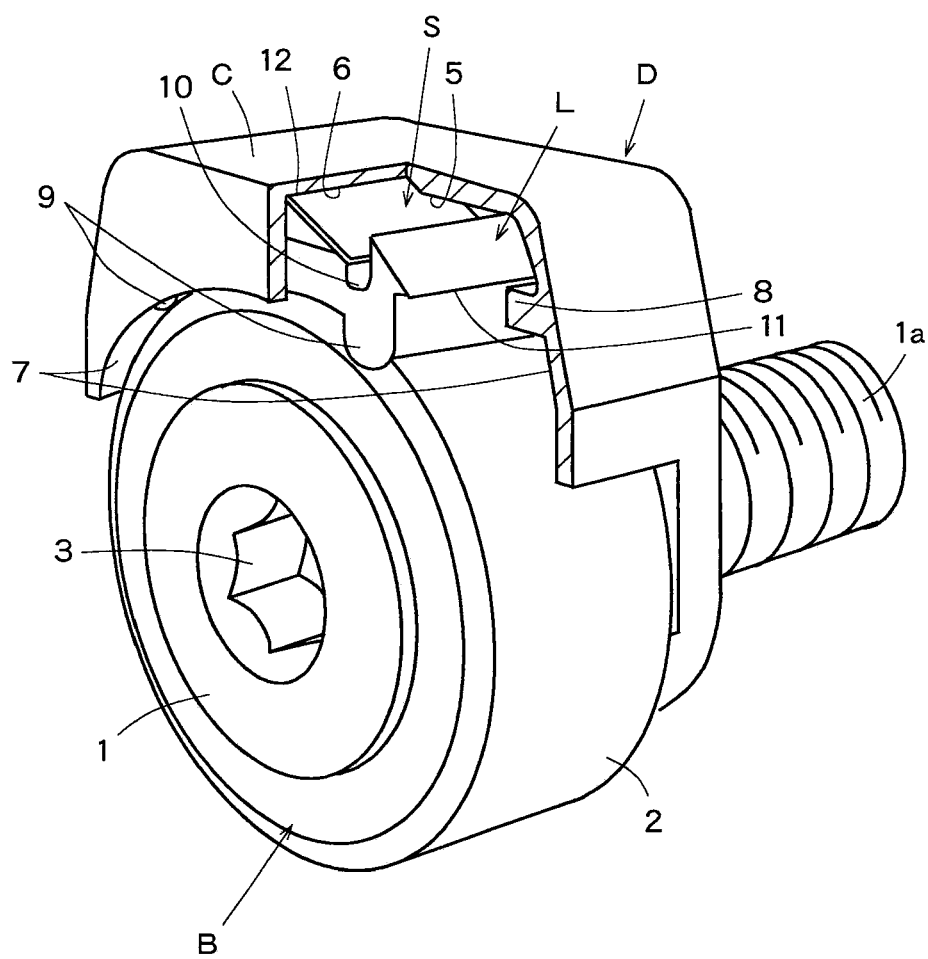
FIG. 3 is a partially cut-away perspective view illustrating a casing of a lubricating apparatus for a follower bearing in related art.
Figure 4:
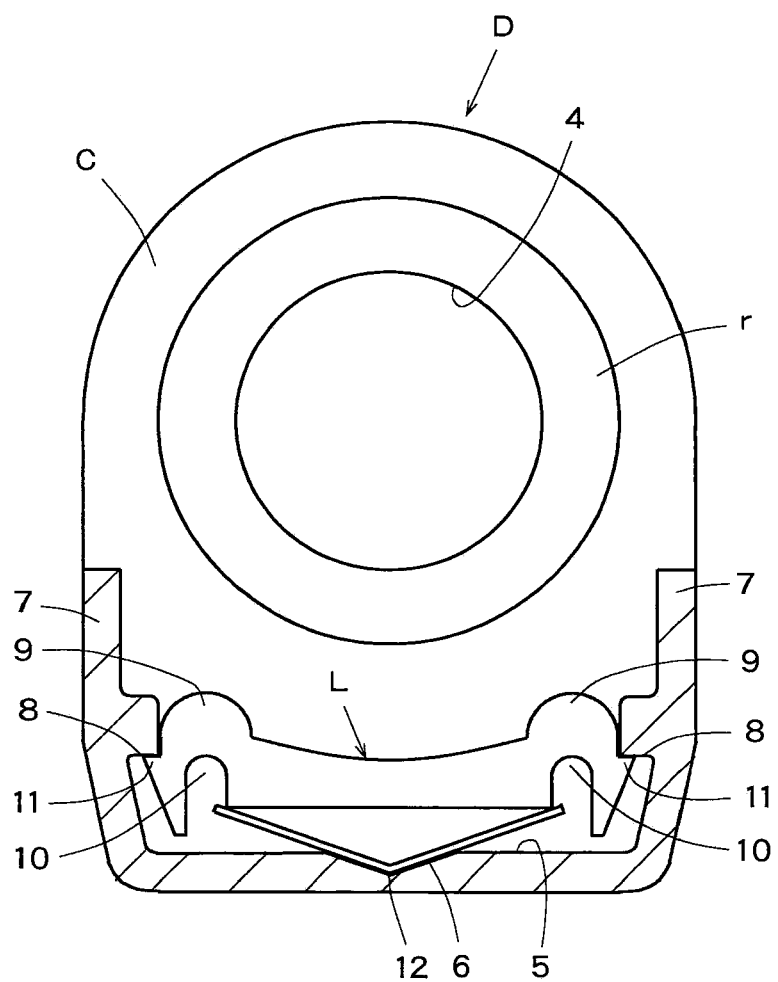
FIG. 4 is a partial cross-sectional view illustrating the casing and a lubricating member mounted with a leaf spring in the lubricating apparatus in related art.

FIGS. 1, 2 illustrate an embodiment according to the present invention in which a leaf spring S differs in structure from that in related art, but the structure of the other components is the same as that in related art. In the following, the same components as those in related art are designated by the same signs.

A follower bearing B used in the embodiment comprises an outer ring 2 rotatably mounted on the periphery of a support shaft 1. The support shaft 1 has an end on which a screw portion 1a is integrally formed. The screw portion 1a extends outward from the outer ring 2. Reference numeral 3 in FIG. 1 denotes a hexagon socket for rotating the screw portion 1a. A hexagon wrench (not shown) is inserted into the hexagon socket 3 to rotate the screw portion 1a.

The follower bearing B is held in a casing C of a lubricating apparatus D which holds a lubricating member L for lubricating the outer ring 2. A shaft hole 4 is formed in the casing C. The screw portion 1a of the outer ring 2 is inserted through the shaft hole 4 such that a bottom face 5 is opposite to the outer ring 2. A positioning recess 6 is formed in a central area of the bottom face 5 a positioning recess 6 and extends parallel to the axis of the support shaft 1. The positioning recess 6 is formed in a mountain-like shape in cross section.

In the casing C, catch pawls 8 are respectively formed on side faces 7 which are parallel to the positioning recess 6.

The lubricating member L, which comprises a sintered resin member of a porous structure impregnated with a lubricant, is mounted in the casing C structured as described above. The lubricating member L used here is made by overheating and solidifying a mixture of a powder of a thermoplastic resin material such as polyethylene or polypropylene with a lubricating oil or a lubricating grease.

A pair of protrusions 9 keeping a predetermined distance from each other is formed on the face of the lubricating member L which will face the outer ring 2 after the lubricating member L is mounted in the casing C. The protrusions 9 are located parallel to the axis of the support shaft 1 and to make contact with the outer ring 2. The contact face of each protrusion 9 is formed in an arc shape.

The lubricating member L has recesses 10 formed in the other face opposite to the face on which the protrusions 9 are formed such that the recesses 10 have the respective downward open ends as shown in FIG. 2. In addition, catch lugs 11 are respectively formed outside the recesses 10 for engagement with the catch pawls 8. Each recess 10 has side faces facing each other, and the inward located side faces of the respective recesses 10 form a pair of parallel wall faces 13.

The lubricating member L designed as described above is mounted in the casing C such that a leaf spring S is interposed between the lubricating member L and the bottom face 5. The leaf spring S has a mountain-like shape in cross section with a top 12 aligned with the positioning recess 6.

A biggest feature in the embodiment is a pair of parallel protruding pieces 14 that are formed at the bottom edges of the leaf spring S of a mountain-like shape and respectively make contact with the wall faces 13 of the lubricating member L. The protruding pieces 14 pinch the pair of the wall faces 13.

For mounting the lubricating member L shaped as described above in the casing C, the wall faces 13 of the lubricating member L are first sandwiched between and pinched by a pair of the parallel protruding pieces 14 of the leaf spring S, so that the leaf spring S is combined with the lubricating member L in one piece. Note that a pair of the protruding pieces 14 are not necessary to be maintained exactly parallel to each other as long as the protruding pieces 14 can produce a adequate force for pinching the wall faces 13.

The lubricating member L combined with the leaf spring S in this manner is pressed into the casing C, and the catch lugs 11 of the lubricating member L are engaged with the catch pawls 8 formed on the casing C.

Note that the catch lug 11 is formed in a shape tapered toward the leading end close to the bottom face 5. Because of the recesses 10, the catch lugs 11 can elastically deform inward, so that the lubricating member L can readily be pressed into a narrower space between the catch pawls 8 of the casing C.

In the embodiment, when the catch lugs 11 are reliably engaged with the catch pawls 8, the top 12 of the leaf spring S is inevitably aligned with the positioning recess 6.

According to the embodiment, since, in the process of mounting the lubricating member L, the lubricating member L and leaf spring S are combined together, the leaf spring S does not deviate from its correct position in the process of mounting the lubricating member L, unlike the case where a leaf spring S is previously set in a casing C before a lubricating member L is pressed into the casing C as described in the related art.

Because the leaf spring S is combined with the lubricating member L before being mounted in the casing C, inadvertent attachment of the two leaf springs S is eliminated. Even if two closely stacked leaf springs S are mounted, one of them can be easily removed.

What is claimed is:

1. A lubricating apparatus for a follower bearing, comprising an outer ring rotating relative to a support shaft, a casing that has a shaft hole formed therein to allow the support shaft to pass through the shaft hole and covers the outer ring of which the support shaft is passed through the shaft hole, a lubricating member including a sintered resin member having a porous structure impregnated with a lubricant and is mounted in the casing, and a leaf spring that is interposed between the casing and the lubricating member and presses the lubricating member against the outer ring, wherein the casing has a bottom face formed opposite to the outer ring, and a positioning recess formed in the bottom face for holding a top of the leaf spring, wherein the lubricating member is formed to have a pair of protrusions protruding from one of the two sides of the lubricating member to make contact with the outer ring and a pair of wall faces formed on the other side opposite to the pair of protrusions, and the leaf spring is formed in a mountain-like shape in cross section, and is provided with a pair of protruding pieces that protrude from bottom edges of the mountain-like shape and respectively make contact with the pair of the wall faces of the lubricating member which are sandwiched between the pair of protruding pieces and, wherein the protruding pieces of the leaf spring pinch the pair of the wall faces of the lubricating member between them with a force such that the leaf spring is combined with the lubricating member in one piece.

2. In a method of assembling a lubricating apparatus and a following bearing as recited in claim 1, the steps comprising:

prior to mounting the lubricating member and leaf spring in the casing, combining the leaf spring and the lubricating member into one piece by sandwiching the wall faces of the lubricating member between the pair of protruding pieces of the leaf spring and pinching the wall faces of the lubricating member by the pair of protruding pieces with a force adequate to combine the leaf spring and the lubricating member into one piece; and mounting the combined lubricating member and leaf spring into the casing.

* * * * *